United States Patent
Naito et al.

(10) Patent No.: US 11,497,202 B2
(45) Date of Patent: Nov. 15, 2022

(54) REEL LEG FIXING APPARATUS

(71) Applicant: Globeride, Inc., Tokyo (JP)

(72) Inventors: Hideyuki Naito, Tokyo (JP); Katsuhiro Oikawa, Tokyo (JP); Masaru Akiba, Tokyo (JP); Yoshiharu Kiyota, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 96 days.

(21) Appl. No.: 15/058,441

(22) Filed: Mar. 2, 2016

(65) Prior Publication Data

US 2016/0286773 A1   Oct. 6, 2016

(30) Foreign Application Priority Data

Mar. 31, 2015 (JP) .............................. JP2015-072565
Mar. 31, 2015 (JP) .............................. JP2015-072566
Jan. 27, 2016 (JP) .............................. JP2016-013559
Jan. 27, 2016 (JP) .............................. JP2016-013560

(51) Int. Cl.
  *A01K 87/06* (2006.01)
  *A01K 89/00* (2006.01)

(52) U.S. Cl.
  CPC .............. *A01K 87/06* (2013.01); *A01K 89/00* (2013.01)

(58) Field of Classification Search
  CPC .................................................. A01K 87/06
  See application file for complete search history.

(56) References Cited

U.S. PATENT DOCUMENTS 4,045,902 A * 9/1977 Ohmura ................. A01K 87/06
                                                    403/261
4,061,806 A * 12/1977 Lindler ................... A01K 87/00
                                                    273/DIG. 23
4,178,713 A * 12/1979 Higuchi ................. A01K 87/00
                                                    428/36.1

(Continued)

FOREIGN PATENT DOCUMENTS

CN   103826450 A      5/2014
EP   2888938 A1 *    7/2015 ............. A01K 87/06

(Continued)

OTHER PUBLICATIONS

Extended European Search Report dated Aug. 12, 2016 for Appln. No. 16159913.9.

(Continued)

*Primary Examiner* — Michael H Wang
(74) *Attorney, Agent, or Firm* — K&L Gates LLP

(57) ABSTRACT

The present invention provides a reel leg fixing apparatus having a sufficient strength in the coupling between the operation nut and the movable hood while reducing the thickness and the weight of the movable hood efficiently and effectively. In the reel leg fixing apparatus according to the present invention, the movable hood and the operation nut are coupled together when a locking portion bent and provided at an end of the movable hood is engaged with a recess at an end of the operation nut. The movable hood is formed of a prepreg sheet as a fiber-reinforced resin member including reinforcement fibers impregnated with a synthetic resin, and the reinforcement fibers oriented at least in the axial direction extend continuously at least in a coupling between the movable hood and the operation nut.

8 Claims, 13 Drawing Sheets

(56) References Cited

U.S. PATENT DOCUMENTS

| | | | |
|---|---|---|---|
| 4,485,580 A | 12/1984 | Ohmura | |
| 4,726,139 A * | 2/1988 | Tokuda | A01K 87/06 43/22 |
| 4,759,147 A * | 7/1988 | Pirazzini | A01K 87/00 428/107 |
| 4,821,447 A * | 4/1989 | Nakayama | A01K 87/06 156/188 |
| 5,088,225 A * | 2/1992 | Yamamoto | A01K 87/06 43/22 |
| 5,199,207 A * | 4/1993 | Nakagawa | A01K 87/06 43/22 |
| 5,347,742 A * | 9/1994 | Ohmura | A01K 87/06 43/22 |
| 5,392,556 A * | 2/1995 | Ozeki | A01K 87/06 43/22 |
| 5,481,820 A * | 1/1996 | Ohmura | A01K 87/06 43/22 |
| 5,529,731 A * | 6/1996 | Bendick | B29C 44/1209 156/173 |
| 5,600,915 A * | 2/1997 | Ohmura | A01K 87/06 43/22 |
| 6,105,301 A * | 8/2000 | Ohmura | A01K 87/06 43/22 |
| 6,438,890 B1 * | 8/2002 | Yamamoto | A01K 87/06 43/22 |
| 6,460,285 B2 * | 10/2002 | Collins | A01K 87/06 43/18.1 CT |
| 6,524,195 B1 * | 2/2003 | Kusumoto | A63B 53/10 473/319 |
| 6,871,441 B1 * | 3/2005 | Tsurufuji | A01K 87/06 43/22 |
| 7,159,355 B2 * | 1/2007 | Muroi | A01K 87/06 43/22 |
| 7,621,067 B2 * | 11/2009 | Ito | A01K 87/06 43/22 |
| 7,888,275 B2 * | 2/2011 | Ward | D04H 1/00 442/353 |
| 9,233,591 B2 * | 1/2016 | Begenau | B29C 70/54 |
| 10,182,562 B2 * | 1/2019 | Noda | A01K 87/00 |
| 2006/0288630 A1 * | 12/2006 | Lin | A01K 87/06 43/22 |
| 2010/0251596 A1 * | 10/2010 | Malcarne | A01K 87/02 43/18.1 CT |
| 2013/0283665 A1 * | 10/2013 | Poe | A01K 87/06 43/22 |
| 2014/0373427 A1 | 12/2014 | Watanabe et al. | |
| 2015/0181852 A1 * | 7/2015 | Akiba | A01K 87/06 43/18.5 |
| 2016/0192628 A1 * | 7/2016 | Omura | A01K 87/06 43/22 |

FOREIGN PATENT DOCUMENTS

| | | |
|---|---|---|
| EP | 2 933 093 | 10/2015 |
| JP | 57-187064 | 5/1981 |
| JP | S58-41168 U | 3/1983 |
| JP | 2000-032882 | 2/2000 |
| JP | 2000-342123 | 12/2000 |
| JP | 3662776 B2 | 6/2005 |
| JP | 2009-065868 | 4/2009 |
| JP | 2010-035428 A | 2/2010 |
| JP | 4979489 B2 | 7/2012 |
| JP | 2014-011975 | 1/2014 |
| JP | 2016-192953 A | 11/2016 |
| JP | 2016-192954 A | 11/2016 |

OTHER PUBLICATIONS

Office Action Korean Patent Application No. 10-2016-0031248 dated Sep. 18, 2017 w/English translation.

First Office Action Chinese Patent Application No. 201610153119.1 dated May 31, 2018 with English translation.

Notice of Reasons for Refusal dated Dec. 5, 2019, of counterpart Japanese Application No. 2016-013559, along with an English translation.

Notice of Reasons for Refusal dated Dec. 5, 2019, of counterpart Japanese Application No. 2016-013560, along with an English translation.

* cited by examiner

REEL LEG FIXING APPARATUS

CROSS-REFERENCE TO RELATED APPLICATIONS

This application is based on and claims the benefit of priority from Japanese Patent Application Serial Nos. 2015-072565 (filed on Mar. 31, 2015), 2015-072566 (filed on Mar. 31, 2015), 2016-013559 (filed on Jan. 27, 2016), and 2016-013560 (filed on Jan. 27, 2016), the contents of which are hereby incorporated by reference in their entirety.

TECHNICAL FIELD

The present invention relates to a reel leg fixing apparatus which is to be mounted on a fishing rod and allows various fishing reels to be mounted thereon.

BACKGROUND

As disclosed in Japanese Utility Model Application Publication No. S57-187064 for example, there is a conventionally known reel leg fixing apparatus including a movable hood and a fixed hood separated in the axial direction, wherein one end of a reel leg is inserted in the fixed hood and the other end of the reel leg is pressed down by the movable hood which is movable in an axial direction, such that the fishing reel is fixed on the reel leg fixing apparatus. The fixed hood and the movable hood are disposed on a pipe-shaped reel seat attached to the outer circumference of a base rod of a fishing rod. An operation nut placed adjacent to the movable hood can be rotated to move the movable hood toward or away from the fixed hood, thereby to attach or detach a fishing reel. The movable hood (hereinafter also referred to as "the hood portion") of the reel leg fixing apparatus are usually formed of a metal material, and a pad portion formed of a synthetic resin is disposed on the portion contacted by the reel leg inserted (an inner surface of the hood portion).

There has recently been a demand for weight reduction of a fishing rod. The hood portion formed of a metal material constitutes an obstacle to weight reduction. Therefore, in Japanese Patent Application Publication No. 2009-65868 for example, the hood portion is formed of a synthetic resin.

As described above, in the reel leg fixing apparatus, the movable hood is moved toward or away from the fixed hood by rotating the operation nut placed adjacent to the movable hood. More specifically, such movement is achieved by a structure where the distal end of the operation nut is coupled with the proximal end of the movable hood and, when the operation nut is rotated in a tightening direction, the movable hood is moved toward the fixed hood without rotation and, when the operation nut is rotated in a loosening direction, the movable hood is moved away from the fixed hood without rotation. As disclosed in Japanese Patent Application Publication No. 2009-65868, the coupling between the distal end of the operation nut and the proximal end of the movable hood is typically achieved by a structure where the operation nut 18 has a annular recess formed at the distal end thereof and the movable hood has an annular locking projection with a bent hook shape formed at the proximal end thereof and engaged into the recess.

Accordingly, such a coupling between the operation nut and the movable hood is subjected to a large pressing force when the operation nut is tightened to press down the reel leg between the movable hood and the fixed hood, and the coupling is also subjected to a large tensile force when the operation nut is loosened to move the movable hood being pressed down away from the fixed hood. Such a force tends to produce stress concentration in the coupling, particularly at the bending portion of the hook-shaped engagement projection of the movable hood, resulting in deformation of the proximal end of the movable hood in the radial direction which may cause the engagement projection to be disengaged from the recess.

Therefore, if the movable hood is formed of a synthetic resin as disclosed in Japanese Patent Application Publication No. 2009-65868 cited above, it is necessary to provide a sufficient strength in the coupling, particularly at the engagement projection of the movable hood. That is, if the movable hood is formed of a resin to reduce the weight, it is essential to provide a sufficient strength in the coupling which tends to be subjected to stress concentration; otherwise, a breakage may occur in the coupling (particularly at the engagement projection of the movable hood). However, a larger thickness for achieving a higher strength may increase the weight rather than reduce it. It is desirable to minimize the thickness for efficient and effective weight reduction in which the strength is maintained.

SUMMARY

The present invention is intended to overcome the above problems, and one object thereof is to provide a reel leg fixing apparatus having a sufficient strength in the coupling between the operation nut and the movable hood while reducing the thickness and the weight of the movable hood efficiently and effectively.

To the above end, the present invention provides a reel leg fixing apparatus comprising: a movable hood having a tubular shape and including a protrusion protruding so as to have an opening for receiving a reel leg of a fishing reel; and an operation nut configured to be operated to move the movable hood in an axial direction, wherein the movable hood and the operation nut are coupled together when a locking portion bent and provided at an end of the movable hood is engaged with a recess at an end of the operation nut, and wherein the movable hood is formed of a fiber-reinforced resin member including reinforcement fibers impregnated with a synthetic resin, and the reinforcement fibers oriented at least in the axial direction extend continuously at least in a coupling between the movable hood and the operation nut.

In the above reel leg fixing apparatus, the movable hood is formed of a fiber-reinforced resin material including reinforcement fibers impregnated with a synthetic resin, and thus the movable hood has a higher strength as compared to that formed only of a synthetic resin, such that the thickness is reduced while the necessary and sufficient strength is maintained. That is, the thickness and the weight of the movable hood can be reduced effectively and efficiently while the sufficient strength thereof is maintained.

In the above arrangement, reinforcement fibers oriented at least in the axial direction extend continuously at least in the coupling between the operation nut and the movable hood which tends to be subjected to stress concentration; therefore, the coupling has a sufficient strength and is safe from a breakage. That is, if the reinforcement fibers oriented in the axial direction are not continuous in the coupling, or more specifically, for example, the reinforcement fibers oriented in the axial direction in the coupling (particularly at the bending portion) constitute two or more radially divided layers, there is possibility that, due to a force working radially outward based on the inherent pressing force or tensile force imparted on the movable hood when the operation nut is tightened or loosened, the radially divided layers may be separated from each other at the interface therebetween along the axial direction. In contrast, with the above arrangement of the present invention, the reinforcement fibers oriented in the axial direction extend continuously in the coupling to resist the forces inherent in the coupling, thus preventing the breakage effectively. Additionally, in the bending portion, the axially oriented fibers arranged continuously also extend in the circumferential direction (the radial direction). Therefore, the coupling as a whole includes the fibers continuously extending in both the axial and circumferential directions, producing a high rigidity of the coupling resisting an axial force and a torsional force.

Further, in the above arrangement, the coupling has a sufficient strength enough to prevent a breakage, if a reinforcement member for restricting radially outward deformation of the movable hood at the coupling is provided around or inside a fiber-reinforced resin member placed in the coupling between the operation nut and the movable hood or in the vicinity thereof. That is, as described above, there is possibility that, due to a force working radially outward based on the inherent pressing force or tensile force imparted on the coupling in the movable hood when the operation nut is tightened or loosened, a breakage may occur in a portion of the fiber-reinforced resin member corresponding to the coupling, depending on the amount and orientation of the reinforcement fibers included in the fiber-reinforced resin member. In contrast, in the present invention having the above reinforcement member, the reinforcement member for restricting radially outward deformation of the movable hood at the coupling is provided around or inside the fiber-reinforced resin member placed in the coupling to resist the forces inherent in the coupling, thus preventing the breakage effectively.

The present invention provides a reel leg fixing apparatus having a sufficient strength in the coupling between the operation nut and the movable hood while reducing the thickness and the weight of the movable hood efficiently and effectively.

BRIEF DESCRIPTION OF THE DRAWINGS

FIGS. 5a and 5b show a first example of a method of forming the movable hood of the reel leg fixing apparatus of FIG. 2, wherein FIG. 5a is a schematic perspective view showing a prepreg sheet for forming the movable hood being rolled around a mandrel, and FIG. 5b is a sectional side view of the mandrel having the prepreg sheet rolled therearound.

FIGS. 6a and 6b show a second example of a method of forming the movable hood of the reel leg fixing apparatus of FIG. 2, wherein FIG. 6a is a schematic perspective view showing a prepreg sheet for forming the movable hood being rolled around a mandrel, and FIG. 6b is a perspective view of the mandrel having the prepreg sheet rolled therearound.

FIG. 7b is a sectional side view of FIG. 7a.

FIG. 8b is a sectional side view of FIG. 8a.

FIGS. 16a and 16b show an example of the method of forming the movable hood of FIG. 15, wherein FIG. 16a is a schematic perspective view showing a circumferential fiber layer for forming a reinforcement member of the movable hood and a Teflon™ tape, being rolled around a mandrel, and FIG. 16b is a sectional side view of a mandrel having the prepreg sheet for forming the movable hood, the reinforcement member, and the Teflon™ tape rolled therearound.

DESCRIPTION OF EXAMPLE EMBODIMENTS

Figure 1:
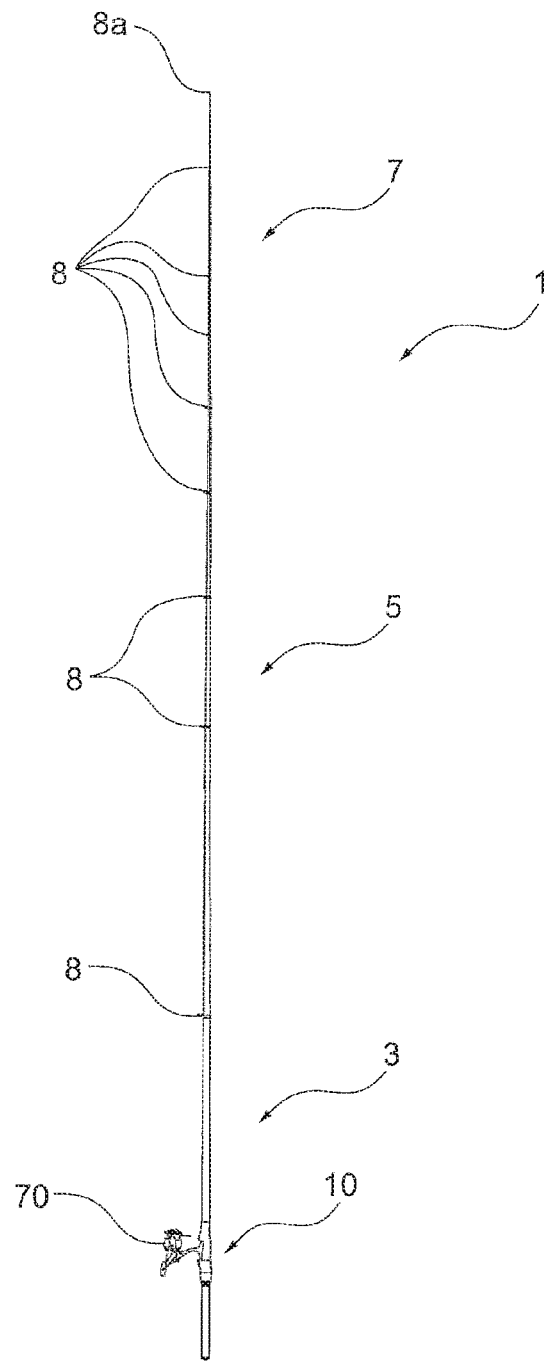
FIG. 1 shows an example of a fishing rod having a reel leg fixing apparatus mounted thereon.

FIG. 1 shows an example of a fishing rod having a reel leg fixing apparatus mounted thereon according to the present invention. The fishing rod 1 may include a plurality of rods jointed together. In the embodiment, the fishing rod 1 may include a base rod 3, an intermediate rod 5, and a tip rod 7; and these three rods may be ordinarily jointed together. The fishing rod 1 may either include no intermediate rod 5 or include four or more intermediate rods jointed together. The type of the fishing rod 1 is not limited but may be a single-rod type, a telescopic type, a drilled-bullet type, as well as the ordinarily jointed type.

On the base rod 3 may be provided a reel leg fixing apparatus 10 on which a fishing reel 70 is to be mounted; and a plurality of line guides 8 may be mounted on each of the rods at regular intervals for guiding the fishing line released from the fishing reel (the line guide provided at the tip end of the tip rod 7 may be a top guide 8a). The line guides 8 may be configured as either fixed guides fixed on the rods or free guides slidable along the rods.

The base rod 3, the intermediate rod 5, and the tip rod 7 may be formed of a fiber reinforced rein material including reinforcement fibers (such as carbon fibers or glass fibers) impregnated with a synthetic resin such as epoxy resin; and these rods may be either tubular or solid.

The reel leg fixing apparatus 10 provided on the base rod 3 may include a fixed hood and a movable hood movable in the axial direction. A fishing reel can be attached to and detached from the reel leg fixing apparatus 10 by moving the movable hood in the axial direction while the reel leg of the fishing reel is inserted into the fixed hood. The fixed hood can be positioned on either the tip side or the butt end side.

Figure 2:
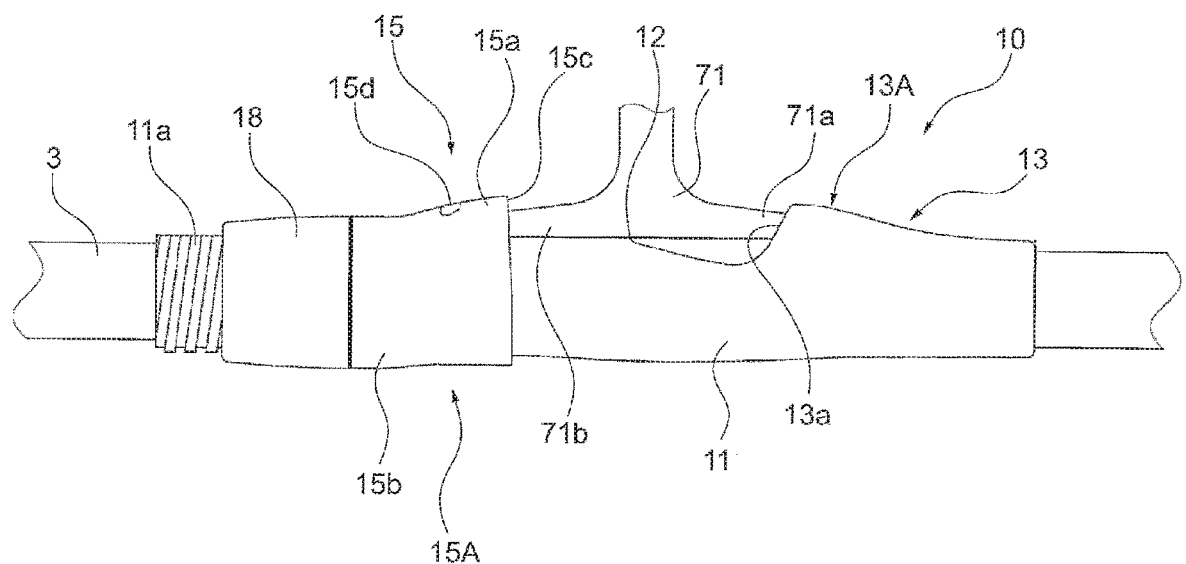
FIG. 2 shows a first embodiment of a reel leg fixing apparatus according to the present invention.
Figure 3:
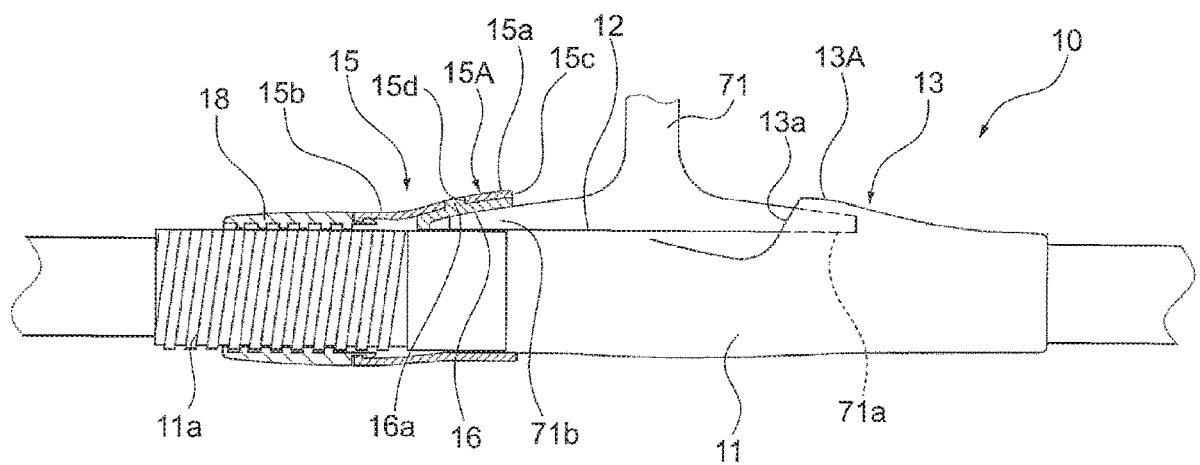
FIG. 3 is a partially sectional view of the reel leg fixing apparatus of FIG. 2, showing the arrangement of the movable hood.

The reel leg fixing apparatus 10 in the embodiment will be described in detail below with reference to FIGS. 2 to 4. The reel leg fixing apparatus 10 may include a reel seat body (hereinafter referred to simply as "body") 11 shaped in a tube to be fitted around the base rod 3. The body 11 may be integrally formed of a synthetic resin and include a placement surface 12 on which the reel leg 71 of the fishing reel 70 may be placed, a fixed hood 13 disposed adjacent to the placement surface 12 on the tip side, and a movable hood 15 disposed adjacent to the placement surface 12 on the butt end side.

The fixed hood 13 may be formed integrally with the body 11 and include a hood portion 13A protruding so as to receive a distal leg portion 71a of the reel leg 71 which is to be inserted through an opening 13a in the hood portion 13A. It may also be possible that the hood portion 13A is formed separately from the body 11 and then integrated with the body 11, as may be for the hood portion of the movable hood (described later).

The movable hood 15 may be movable along the axial direction and include a hood portion 15A formed separately from the body 11. The hood portion 15A of the embodiment may include a protrusion 15a protruding so as to be capable of receiving a butt end-side leg portion 71b of the reel leg 71, and a cylindrical portion 15b formed integrally on the butt end side of the protrusion 15a. That is, the protrusion 15a may be shaped such that an arcuate area in a certain region of the outer circumference of the cylindrical portion 15b gradually rises toward the tip; and the butt end-side leg portion 71b of the reel leg 71 may be inserted through the opening 15c in the protrusion 15a.

Inside the protrusion 15a may be disposed a pad member 16 so as to be pressed by the surface of the butt end-side leg portion 71b of the reel leg 71 inserted. When the movable hood 15 is moved toward the fixed hood 13, the pad member 16 may be pressed against the surface of the butt end-side leg portion 71b of the reel leg 71 so as to securely fix the reel leg 71. The pad member 16 may be shaped so as to conform to the surface of the butt end-side leg portion 71b of the reel leg 71. When the projection 16a of the pad member 16 is fitted in a hole 15d formed in the protrusion 15a of the movable hood 15, the pad member 16 may be integrated with the inner surface of the protrusion 15a.

In the butt end-side of the body 11 may be integrally formed an external thread 11a. On the external thread 11a may be screwed an operation nut 18 which may be rotated to move along the axial direction. The operation nut 18 may be coupled at the distal end thereof with the movable hood 15 (the cylindrical portion 15b of the hood portion 15A). In this engagement, the operation nut 18 rotated in the tightening direction may be moved toward the fixed hood 13 without rotation of the movable hood 15, and the operation nut 18 rotated in the loosening direction may be moved away from the fixed hood 13 without rotation of the movable hood 15.

Figure 4A:
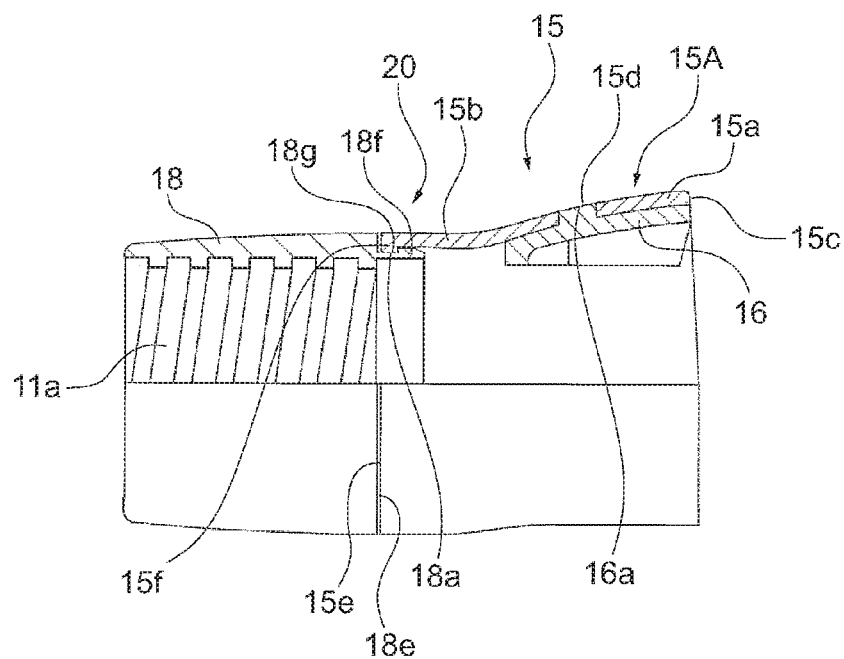
FIG. 4a is an enlarged view of a main part of the reel leg fixing apparatus shown in FIG. 3.

More specifically, as shown in FIG. 4a, an annular projection 18a may be formed on an end edge 18e of the operation nut 18 facing the cylindrical portion 15b, and a locking projection 18f projecting radially outward may be formed on the distal end of the annular projection 18a, so as to form an annular recess 18g in the outer circumferential surface of the distal end portion of the operation nut 18. Also, an annular locking projection 15f as a locking portion projecting radially inward and bent in a hook shape may be formed in an end edge (proximal end edge) 15e of the cylindrical portion 15b of the movable hood 15 facing the operation nut 18. The locking projection 15f may be locked on the recess 18g such that the operation nut 18 and the movable hood 15 may be coupled with each other. The coupling is indicated by the reference numeral 20 in FIG. 4a.

With such an engagement (coupling) between the operation nut 18 and the hood portion 15A (the cylindrical portion 15b), the operation nut 18 rotated in the tightening direction may be screwed toward the fixed hood 13 while the movable hood 15 (the cylindrical portion 15b of the hood portion 15A) is moved toward the fixed hood 13 without rotation since the end edge 18e contacts the end edge 15e. Thus, the reel leg 71 placed on the placement surface 12 may be tightly fixed between the fixed hood 13 and the movable hood 15. The operation nut 18 rotated in the loosening direction may be screwed away from the fixed hood 13 while the movable hood 15 (the cylindrical portion 15b of the hood portion 15A) is moved away from the fixed hood 13 without rotation since the locking projection 15f is engaged with the recess 18g. Thus, the reel leg 71 placed on the placement surface 12 can be detached from the fixed hood 13 and the movable hood 15.

Figure 5A:
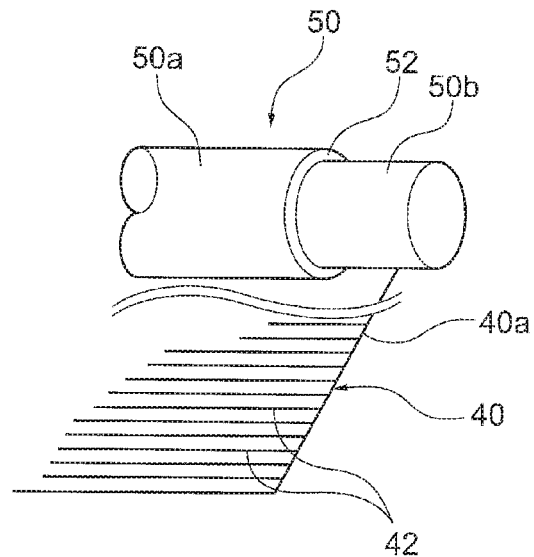

The movable hood 15 (the hood portion 15A) may be formed of a fiber reinforced resin material including reinforcement fibers (e.g., carbon fibers, glass fibers, etc.) impregnated with a synthetic resin, so as to reduce the weight while maintaining the strength at a certain level. In the embodiment, the movable hood 15 may be formed of the prepreg sheet 40 as shown in FIG. 5a. The prepreg sheet 40 may include the reinforcement fibers arranged regularly at least in an axial orientation (including the circumferential orientation perpendicular to the axial orientation and an oblique orientation at an angle of less than 90° with respect to the axial orientation) or include the reinforcement fibers woven together, and the reinforcement fibers may be impregnated with a thermoplastic resin (such as Nylon, polypropylene, polyphenyl sulfide, or thermoplastic polyurethane) or a thermosetting resin (such as epoxy resin, phenol resin, or polyester resin) as a matrix resin.

Figure 5B:
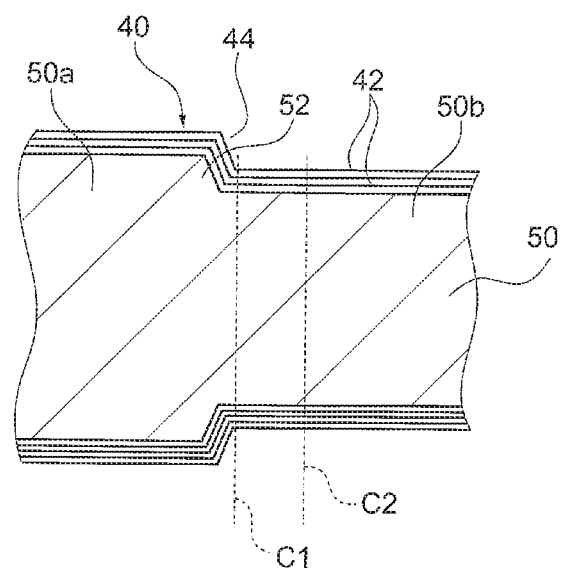

FIGS. 5a and 5b show a first example of a method of forming the movable hood 15, wherein FIG. 5a is a schematic perspective view showing a prepreg sheet for forming the movable hood 15 being rolled around a mandrel 50, and FIG. 5b is a sectional side view of the mandrel 50 having the prepreg sheet 40 rolled therearound. The movable hood 15 may be formed by rolling the prepreg sheet 40 on the mandrel 50 having a predetermined shape, heating the prepreg sheet to cure the synthetic resin, and then pulling out the mandrel 50. FIG. 5a (and all later figures) schematically shows the reinforcement fibers 42 arranged in the axial orientation. The mandrel 50 may include a large-diameter column 50*a* and a small-diameter column 50*b* so as to have a step 52 for forming the bending portion 44 of the locking projection 15*f* of the movable hood 15 corresponding to the coupling 20.

The prepreg sheet 40 for forming the axially oriented fiber layer may have such a length that the reinforcement fibers 42 arranged at least in the axial orientation extend continuously without a break in the coupling 20 between the operation nut 18 and the movable hood 15 (e.g., the reinforcement fibers 42 arranged in the axial orientation extend continuously without a break over the entire length of the movable hood 15), and the prepreg sheet 40 may be rolled around the mandrel 50 so as to extend across the step 52 of the mandrel 50. The proximal end edge 40*a* of the prepreg sheet 40 may be positioned on the mandrel 50 so as to go beyond the actual proximal end of the movable hood 15 (the end on the coupling 20 side). In this case, the movable hood 15 may be cut to a necessary length along the cut line C1 (C2) as shown in FIG. 5*b* after pulling out the mandrel.

After the prepreg sheet 40 is thus rolled around the mandrel 50, a fastening tape (not shown) may be rolled around the prepreg sheet 40 to fasten the prepreg sheet 40 so as to bend the reinforcement fiber 42 at the step 52 and form the bending portion 44 as shown in FIG. 5*b*. Finally, the prepreg sheet 40 may be heated to cure the synthetic resin, and then the mandrel 50 may be pulled out and the prepreg sheet 40 may be cut as necessary.

If the prepreg sheet 40 only includes fiber reinforcement fibers extending in the axial direction, at least a circumferential fiber layer (or an oblique fiber layer such as a woven fabric) may be disposed outside or inside the prepreg sheet 40 as necessary by axially rolling another prepreg sheet (not shown) including the reinforcement fibers arranged regularly in, e.g., the circumferential direction (or in an oblique direction at an angle smaller than 90° with respect to the axial direction).

Figure 6A:
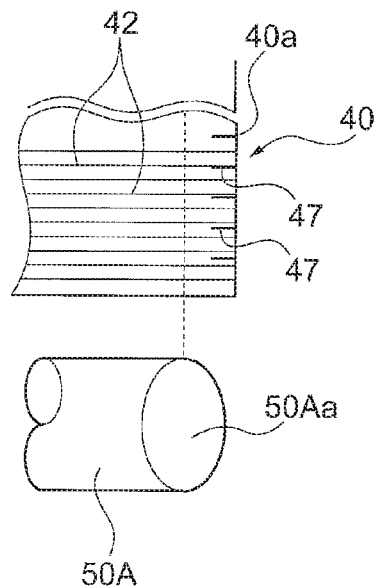
Figure 6B:
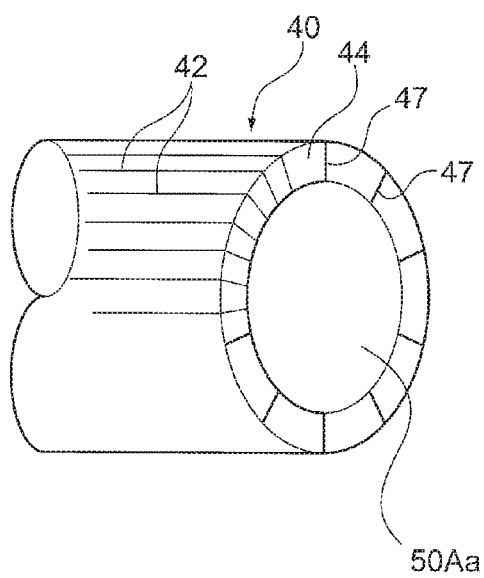

FIGS. 6*a* and 6*b* show a second example of a method of forming the movable hood 15, wherein FIG. 6*a* is a schematic perspective view showing a prepreg sheet for forming the movable hood being rolled around a mandrel, and FIG. 6*b* is a sectional side view of the mandrel having the prepreg sheet rolled therearound. In this method, a mandrel 50A may have a constant diameter over the entire length thereof and, as shown in FIG. 6*a*, a plurality of slits 47 having a length almost corresponding to the length of the locking projection 15*f* may be provided at regular intervals in the proximal end edge 40*a* of the prepreg sheet 40 (in this embodiment, the slits may be provided at regular intervals over the entire circumference of the proximal end of the movable hood 15 included in the coupling 20). After the prepreg sheet 40 is rolled around the mandrel 50A, the proximal end of the prepreg sheet 40 may be bent using the slits 47 to abut on the proximal end surface 50Aa of the mandrel 50A and form the bending portion 44, as shown in FIG. 6*b* (this may be achieved by, e.g., rolling a fastening tape as described above). The prepreg sheet 40 may be heated to cure the synthetic resin, and then the mandrel 50A may be pulled out.

Figure 7A:
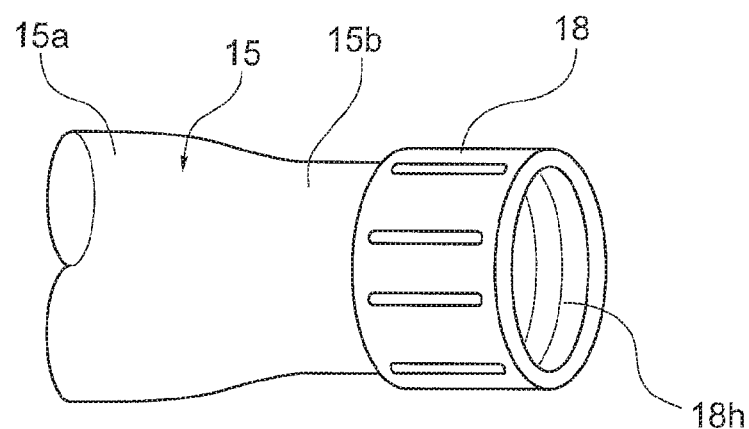
FIG. 7a is a perspective view showing the movable hood formed by the method of FIGS. 5a and 5b or FIGS. 6a and 6b and connected to the operation nut.
Figure 7B:
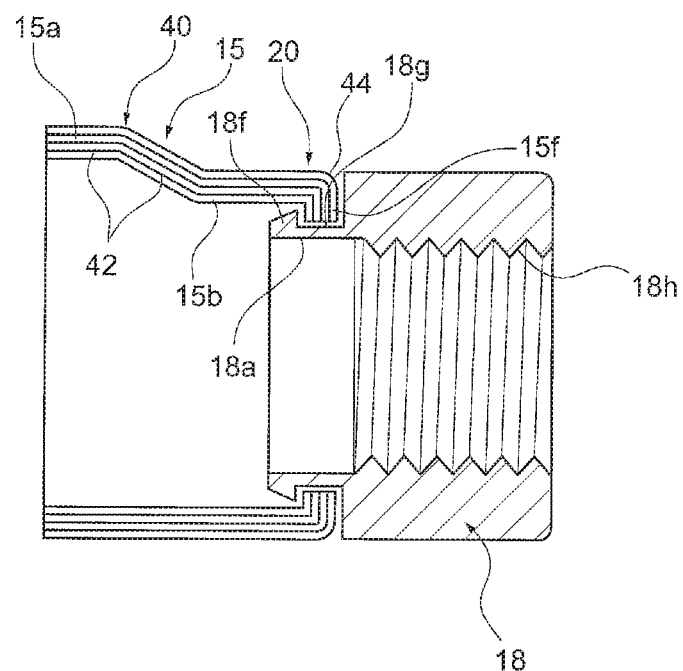

FIG. 7*a* (a perspective view) and FIG. 7*b* (a sectional side view) show that the movable hood 15 is connected (coupled) with the operation nut 18, wherein at least a portion of the movable hood 15 corresponding to the coupling 20 may be formed by the method of FIGS. 5*a* and 5*b* and cut along the cut line C1 (see FIG. 5*b*) or formed by the method of FIGS. 6*a* and 6*b*. This coupling state has already been described in connection with FIG. 4*b*, and thus the description is omitted here.

As seen from FIG. 7*b*, the movable hood 15 may include the reinforcement fibers 42 oriented at least in the axial direction and extending continuously without a break (e.g., over the almost entire length of the movable hood 15) at least in the coupling 20 between the operation nut 18 and the movable hood 15. The reinforcement fibers 42 oriented at least in the axial direction may extend continuously without a break from the end of the locking projection 15*f* (the end surface facing radially inward at the proximal end of the movable hood 15) through the bending portion 44 of the locking projection 15*f* to the protrusion 15*a*.

As described above, in the reel leg fixing apparatus 10 of the embodiment, the movable hood 15 may be formed of a fiber-reinforced resin material including reinforcement fibers impregnated with a synthetic resin, and thus the movable hood 15 may have a higher strength as compared to that formed only of a synthetic resin, such that the thickness can be reduced while the necessary and sufficient strength is maintained. That is, the thickness and the weight of the movable hood can be reduced effectively and efficiently while the sufficient strength thereof is maintained.

In the embodiment, the reinforcement fibers 42 oriented at least in the axial direction extend continuously at least in the coupling 20 between the operation nut 18 and the movable hood 15 which may tend to be subjected to stress concentration; therefore, the coupling 20 may have a sufficient strength and may be safe from a breakage. That is, if the reinforcement fibers 42 oriented in the axial direction are not continuous in the coupling 20, or more specifically, for example, the reinforcement fibers oriented in the axial direction in the coupling 20 (particularly at the bending portion 44) constitute two or more radially divided layers, there is possibility that, due to a force working radially outward based on the inherent pressing force or tensile force imparted on the movable hood 15 when the operation nut is tightened or loosened, the radially divided layers may be separated from each other at the interface therebetween along the axial direction. In contrast, with the above arrangement of the embodiment, the reinforcement fibers 42 oriented in the axial direction may extend continuously in the coupling 20 to resist the forces inherent in the coupling 20, thus preventing the breakage effectively. Additionally, in the bending portion 44, the axially oriented fibers arranged continuously also extend in the circumferential direction (the radial direction) (see FIG. 7*b*). Therefore, the coupling 20 as a whole includes the fibers continuously extending in both the axial and circumferential directions (this tendency is significant particularly in the second embodiment shown in FIG. 9 which will be described later), producing a high rigidity of the coupling resisting an axial force and a torsional force.

Figure 4B:
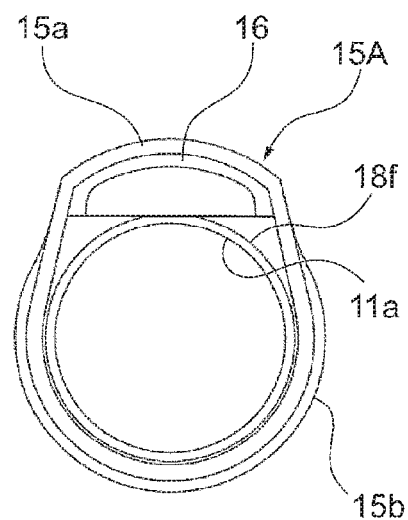
FIG. 4b shows the movable hood of FIG. 4a as viewed from the opening.

The movable hood 15 (the hood portion 15A) according to FIGS. 4*a* and 4*b* may be formed of a fiber reinforced resin material including reinforcement fibers (e.g., carbon fibers, glass fibers, etc.) impregnated with a synthetic resin, so as to reduce the weight while maintaining the strength at a certain level. In the embodiment, the movable hood 15 may be formed of the prepreg sheet 40 (see FIGS. 8*b* and 8*c*). The prepreg sheet 40 may include the reinforcement fibers arranged regularly in, e.g., the axial orientation, the circumferential orientation perpendicular to the axial orientation, and an oblique orientation at an angle of less than 90° with respect to the axial orientation, or the prepreg sheet 40 may include the reinforcement fibers woven together, and the reinforcement fibers may be impregnated with a thermoplastic resin (such as Nylon, polypropylene, polyphenyl sulfide, or thermoplastic polyurethane) or a thermosetting resin (such as epoxy resin, phenol resin, or polyester resin) as a matrix resin.

If the movable hood 15 is formed of a prepreg sheet 40, the movable hood 15 may be formed by rolling the prepreg sheet 40 on a mandrel (not shown) having a predetermined shape, heating the prepreg sheet 40 to cure the synthetic resin, and then pulling out the mandrel. In this case, the mandrel may include, for example, a large-diameter column and a small-diameter column so as to have a step for forming the bending portion 44 (as shown in FIG. 8b) of the locking projection 15f of the movable hood 15 corresponding to the coupling 20. A fastening tape (not shown) may be rolled around the prepreg sheet 40 to fasten the prepreg sheet 40 so as to bend the carbon fibers at the step to form the bending portion 44. Further, as shown, the prepreg sheet 40 may be constituted by a plurality of layers depending on the desired shape and durability of the movable hood 15, and the arrangement (orientation, weaving state, etc.) of the reinforcement fibers in each layer can be modified as necessary.

Figure 8A:
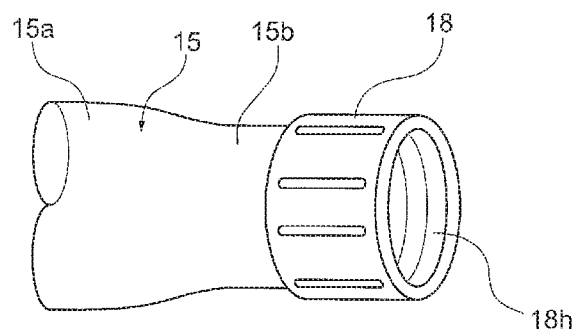
FIG. 8a is a perspective view showing the movable hood connected to the operation nut.
Figure 8B:
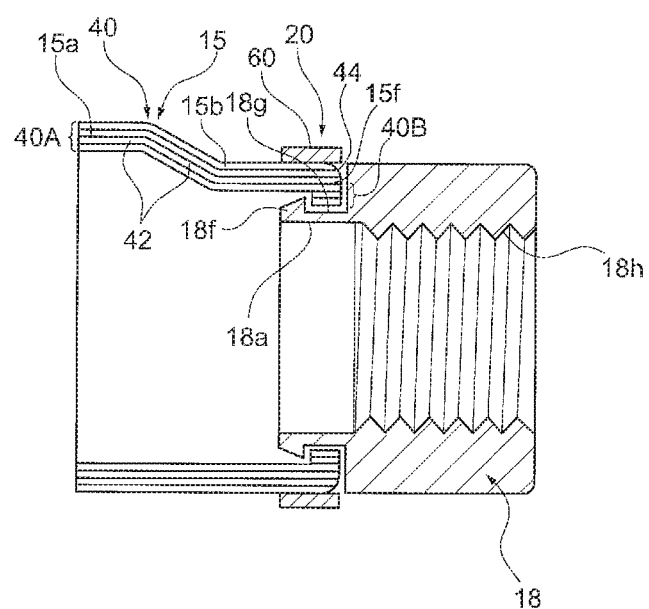

FIG. 8a (a perspective view) and FIG. 8b (a sectional side view) show that the movable hood 15 formed of the prepreg sheet 40 as described above is connected (coupled) with the operation nut 18. This coupling state has already been described in connection with FIG. 4b, and thus the description is omitted here.

Figure 8C:
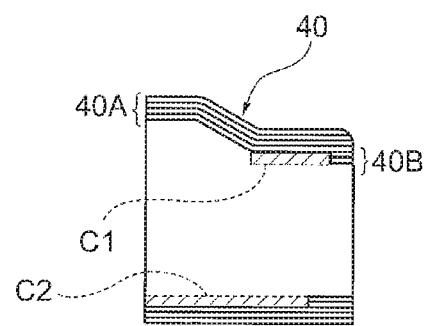
FIG. 8c is a schematic side view showing an aspect of the method of forming the movable hood.

In the example shown in FIG. 8b, the prepreg sheet forming the movable hood 15 may be constituted by a plurality of layers each including the reinforcement fibers 42 oriented in the axial direction. In this example, the coupling 20 (particularly the bending portion 44) may have the reinforcement fibers 42 oriented in the axial direction that constitute two layers 40A, 40B stacked together in the radial direction. Such a two-layer structure may be obtained by forming the prepreg sheet 40 into a predetermined shape and then cutting off the predetermined internal portions C1, C2 of the prepreg sheet 40, as shown in FIG. 8c.

In the embodiment, a reinforcement member 60 may be provided around the fiber-reinforced resin member (prepreg sheet 40) located in the coupling 20 so as to restrict the deformation of the movable hood 15 in the radially outward direction at the coupling 20. More specifically, the reinforcement member 60 constituted by a ring-shaped metal member (metal ring) may be fitted around the locking projection 15f of the movable hood 15 (on the immediate distal end side (the side facing the protrusion 15a) of the bending portion 44). The reinforcement member 60 may restrict the radially outward deformation of the prepreg sheet 40 at this portion. That is, such a ring-shaped reinforcement member may eliminate stress concentration in the coupling and prevent removal of the locking projection 15f from the recess 18g. The reinforcement member 60 may be constituted by a prepreg sheet including reinforcement fibers oriented in the circumferential direction, instead of a metal ring.

As described above, in the reel leg fixing apparatus 10 of the embodiment, the movable hood 15 may be formed of a fiber-reinforced resin material including reinforcement fibers impregnated with a synthetic resin, and thus the movable hood 15 may have a higher strength as compared to that formed only of a synthetic resin, such that the thickness can be reduced while the necessary and sufficient strength is maintained. That is, the thickness and the weight of the movable hood can be reduced effectively and efficiently while the sufficient strength thereof is maintained.

Further, in the embodiment, the coupling 20 may have a sufficient strength enough to prevent a breakage, because the reinforcement member 60 for restricting radially outward deformation of the movable hood 15 at the coupling 20 is provided around the fiber-reinforced resin member (prepreg sheet 40) placed in the coupling 20 between the operation nut 18 and the movable hood 15 or in the vicinity thereof. That is, if the reinforcement fibers 42 oriented in the axial direction are not continuous in the coupling 20 unlike the embodiment, or more specifically, as shown in FIG. 8b, the reinforcement fibers oriented in the axial direction in the coupling 20 (particularly at the bending portion 44) constitute two or more radially divided layers 40A, 40B, there is possibility that, due to a force working radially outward based on the inherent pressing force or tensile force imparted on the coupling 20 of the movable hood 15 when the operation nut 18 is tightened or loosened, the radially divided layers 40A, 40B may be separated from each other at the interface therebetween along the axial direction. In contrast, with the above arrangement of the embodiment, the reinforcement member 60 for restricting radially outward deformation of the movable hood 15 in the coupling 20 may be provided around the fiber-reinforced resin member (prepreg sheet 40) placed in the coupling 20 to resist the forces inherent in the coupling 20, thus preventing the breakage effectively.

Figure 9:
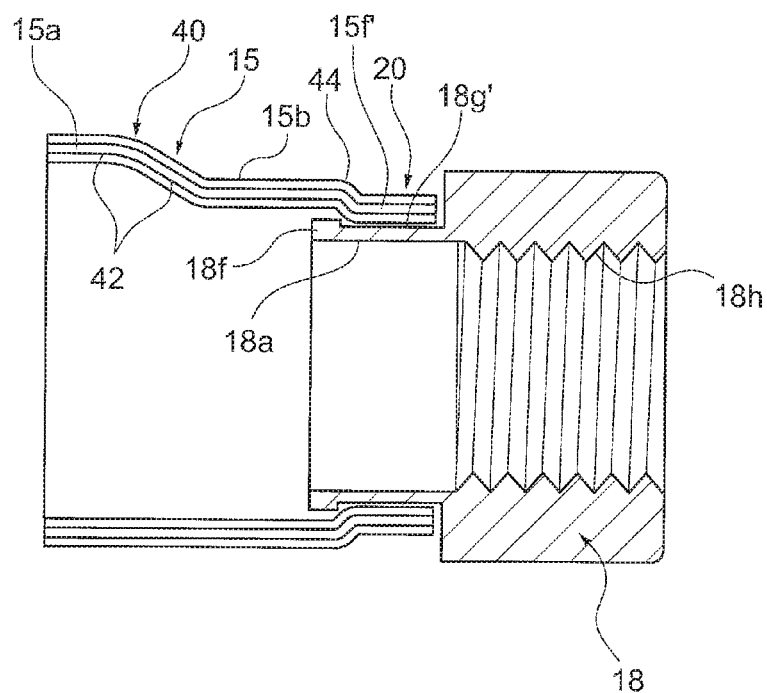
FIG. 9 is a sectional side view of the movable hood of the reel leg fixing apparatus according to a second embodiment of the present invention and the operation nut coupled therewith.

FIG. 9 is a sectional side view of the movable hood 15 of the reel leg fixing apparatus according to a second embodiment of the present invention and the operation nut 18 coupled therewith. As shown, in the embodiment, the movable hood 15 may have at least a portion corresponding to the coupling 20 formed by the method shown in FIGS. 5a and 5b, wherein the prepreg sheet 40 may be cut along the cut line C2 shown in FIG. 5b. That is, in the embodiment, the recess 18g' of the operation nut 18 may be longer in the axial direction than the recess 18g of the first embodiment, and accordingly the locking projection 15f of the movable hood 15 extending on the proximal end side of the bending portion 44 and locked in the recess 18g' may also be longer in the axial direction. With such an arrangement, the same effect as in the first embodiment may be obtained, and the coupling state (locking state) in the coupling 20 may be more secure with increased rigidity in the coupling 20.

Figure 10:
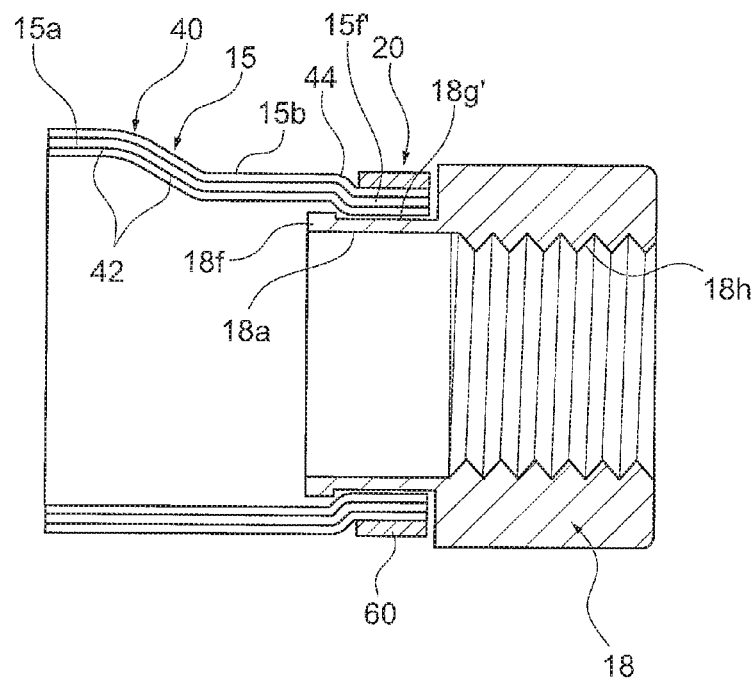
FIG. 10 is a sectional side view of the movable hood of the reel leg fixing apparatus according to a third embodiment of the present invention and the operation nut coupled therewith.

FIG. 10 is a sectional side view of the movable hood 15 of the reel leg fixing apparatus according to a third embodiment of the present invention and the operation nut 18 coupled therewith. As shown, in the embodiment, a reinforcement member 60 may be provided around the fiber-reinforced resin member located in the coupling 20 so as to restrict the deformation of the movable hood 15 in the radially outward direction at the coupling 20. More specifically, the reinforcement member 60 constituted by a ring-shaped metal member (metal ring) may be fitted around the locking projection 15f of the movable hood 15 according to the second embodiment (on the immediate proximal end side of the bending portion 44). The reinforcement member 60 may restrict the deformation, and particularly the radially outward deformation of the prepreg sheet 40 at this portion. That is, such a ring-shaped reinforcement member may eliminate stress concentration in the coupling and prevent removal of the locking projection 15f from the recess 18g'. The reinforcement member 60 may be constituted by a prepreg sheet including reinforcement fibers oriented in the circumferential direction, instead of a metal ring. Such a prepreg sheet including reinforcement fibers oriented in the circumferential direction can also restrict the radially outward deformation of the prepreg sheet 40 effectively.

Figure 11:
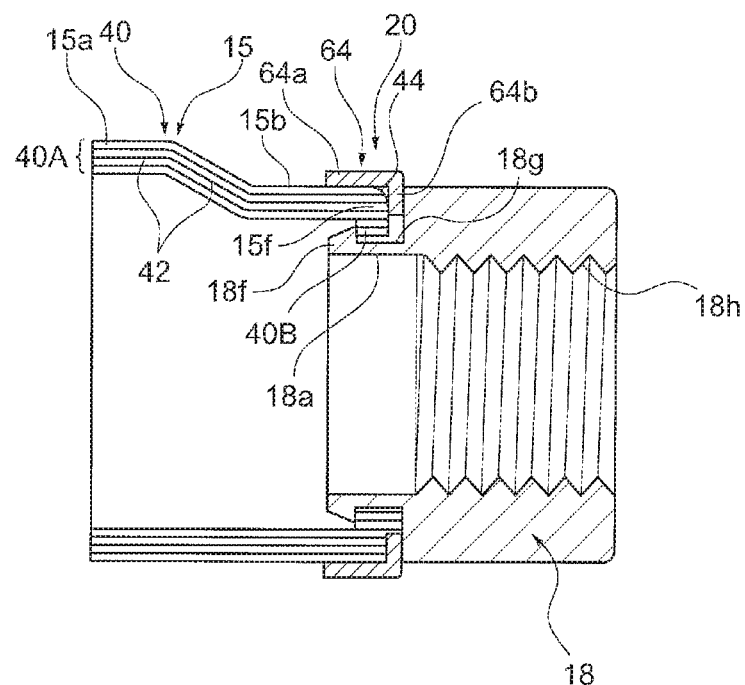
FIG. 11 is a sectional side view of the movable hood of the reel leg fixing apparatus according to a fourth embodiment of the present invention and the operation nut coupled therewith.

FIG. 11 is a sectional side view of the movable hood 15 of the reel leg fixing apparatus according to a fourth embodiment of the present invention and the operation nut 18 coupled therewith. As shown, in the embodiment, a reinforcement member 64 may be provided around the fiber-reinforced resin member (prepreg sheet 40) located in the coupling 20 so as to restrict the deformation of the movable hood 15 in the radially outward direction at the coupling 20. More specifically, the reinforcement member 64 constituted by a metal ring may be fitted around the locking projection 15f of the movable hood 15 according to the first embodiment so as to extend across the bending portion 44. Accordingly, the reinforcement member 64 may include a cylindrical portion 64a extending axially on the distal end side of the bending portion 44 and a bending flange 64b extending radially inward from the bending portion 44. Such a reinforcement member 64 may restrict the deformation of the prepreg sheet 40 in the radially outward and axially outward directions at this portion, thereby eliminating stress concentration at this portion and thus preventing the removal of the locking projection 15f from the recess 18g. The reinforcement member 64 may be constituted by a prepreg sheet including reinforcement fibers oriented in the circumferential direction, instead of a metal ring. Such a prepreg sheet including reinforcement fibers oriented in the circumferential direction can also restrict the deformation of the prepreg sheet 40 effectively.

Figure 12:
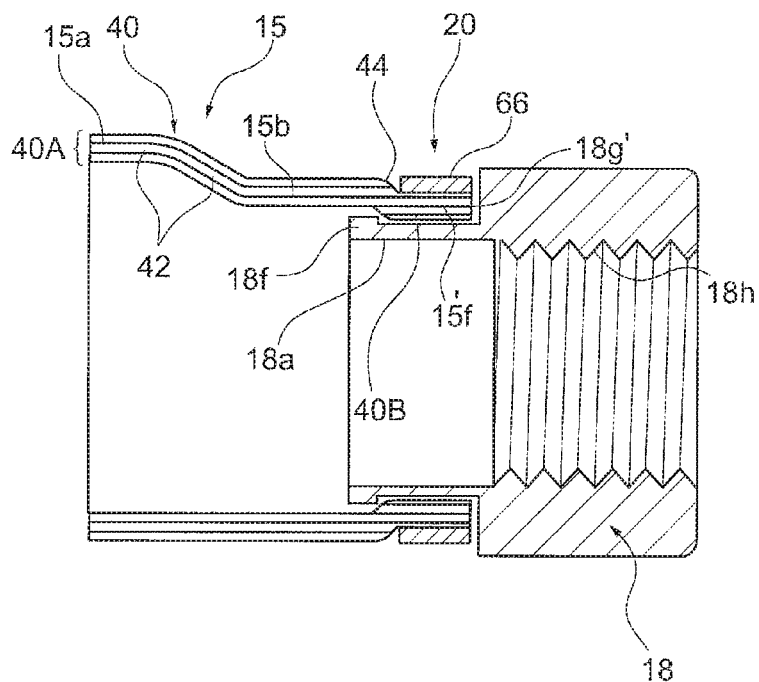
FIG. 12 is a sectional side view of the movable hood of the reel leg fixing apparatus according to a fifth embodiment of the present invention and the operation nut coupled therewith.

FIG. 12 is a sectional side view of the movable hood 15 of the reel leg fixing apparatus according to a fifth embodiment of the present invention and the operation nut 18 coupled therewith. As shown, in the embodiment, the recess 18g' of the operation nut 18 may be longer in the axial direction than the recess 18g of the first embodiment, and accordingly the locking projection 15f' of the movable hood 15 extending on the proximal end side of the bending portion 44 and locked in the recess 18g' may also be longer in the axial direction. With such an arrangement, the same effect as in the first embodiment may be obtained, and the coupling state (locking state) in the coupling 20 may be more secure with increased rigidity in the coupling 20.

In the embodiment, a reinforcement member 66 may be additionally provided around the fiber-reinforced resin member (prepreg sheet 40) located in the coupling 20 so as to restrict the deformation of the movable hood 15 in the radially outward direction at the coupling 20. More specifically, the reinforcement member 66 constituted by a metal ring may be fitted around the locking projection 15f' of the movable hood 15 (on the portion extending from the bending portion 44 toward the operation nut 18). The reinforcement member 66 may restrict the radially outward deformation of the prepreg sheet 40 at this portion and eliminate stress concentration at this portion. Thus, the reinforcement member 66 may prevent removal of the locking projection 15f' from the recess 18g'. The reinforcement member 66 may be constituted by a prepreg sheet including reinforcement fibers oriented in the circumferential direction, instead of a metal ring. Such a prepreg sheet including reinforcement fibers oriented in the circumferential direction can also restrict the deformation of the prepreg sheet 40 effectively.

Figure 13:
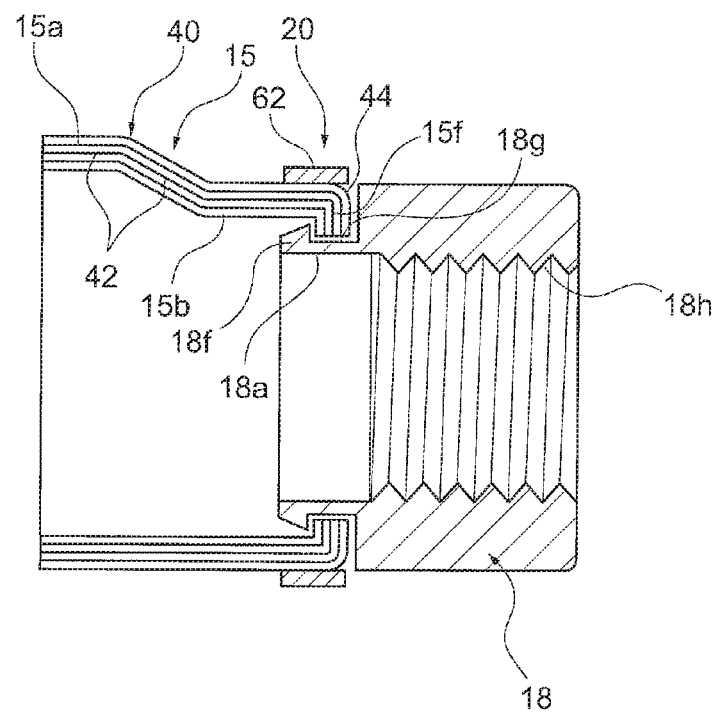
FIG. 13 is a sectional side view of the movable hood of the reel leg fixing apparatus according to a sixth embodiment of the present invention and the operation nut coupled therewith.

FIG. 13 is a sectional side view of the movable hood 15 of the reel leg fixing apparatus according to a sixth embodiment of the present invention and the operation nut 18 coupled therewith. As shown, in the embodiment, a reinforcement member 62 may be provided around the fiber-reinforced resin member located in the coupling 20 so as to restrict the deformation of the movable hood 15 in the radially outward direction at the coupling 20. More specifically, the reinforcement member 62 constituted by a metal ring may be fitted around the locking projection 15f of the movable hood 15 according to the first embodiment (on the immediate distal end side (the side facing the protrusion 15a) of the bending portion 44). The reinforcement member 62 may restrict the radially outward deformation of the prepreg sheet 40 at this portion and eliminate stress concentration at this portion, thus preventing removal of the locking projection 15f from the recess 18g. The reinforcement member 62 may be constituted by a prepreg sheet including reinforcement fibers oriented in the circumferential direction, instead of a metal ring.

Figure 14:
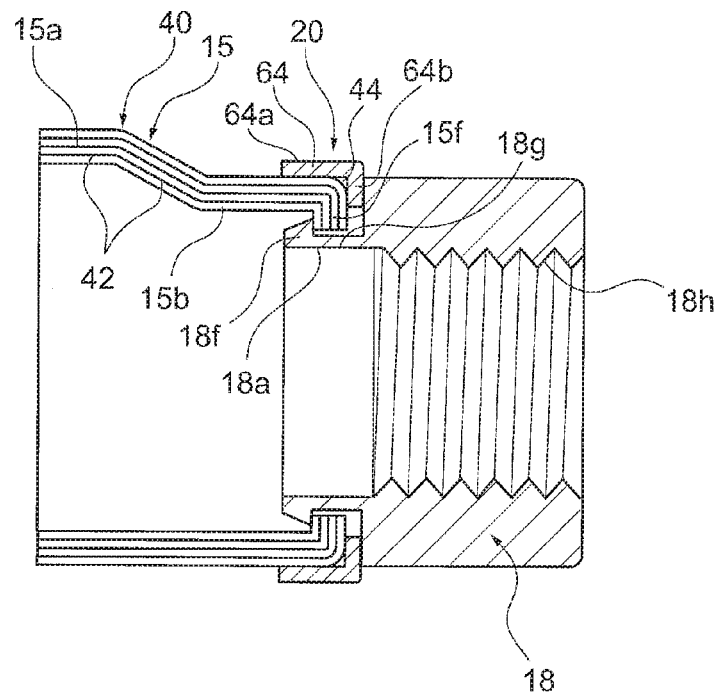
FIG. 14 is a sectional side view of the movable hood of the reel leg fixing apparatus according to a seventh embodiment of the present invention and the operation nut coupled therewith.

FIG. 14 is a sectional side view of the movable hood 15 of the reel leg fixing apparatus according to a seventh embodiment of the present invention and the operation nut 18 coupled therewith. As shown, in the embodiment, a reinforcement member 64 may be provided around the fiber-reinforced resin member located in the coupling 20 so as to restrict the deformation of the movable hood 15 in the radially outward direction at the coupling 20. More specifically, the reinforcement member 64 constituted by a metal ring may be fitted around the locking projection 15f of the movable hood 15 according to the first embodiment so as to extend across the bending portion 44. Accordingly, the reinforcement member 64 may include a cylindrical portion 64a extending axially on the distal end side of the bending portion 44 and a bending flange 64b extending radially inward from the bending portion 44. Such a reinforcement member 64 may restrict the deformation of the prepreg sheet 40 in the radially outward and axially outward directions at this portion, thereby eliminating stress concentration at this portion and thus preventing the removal of the locking projection 15f from the recess 18g. The reinforcement member 64 may be constituted by a prepreg sheet including carbon fibers oriented in the circumferential direction, instead of a metal ring.

Figure 15:
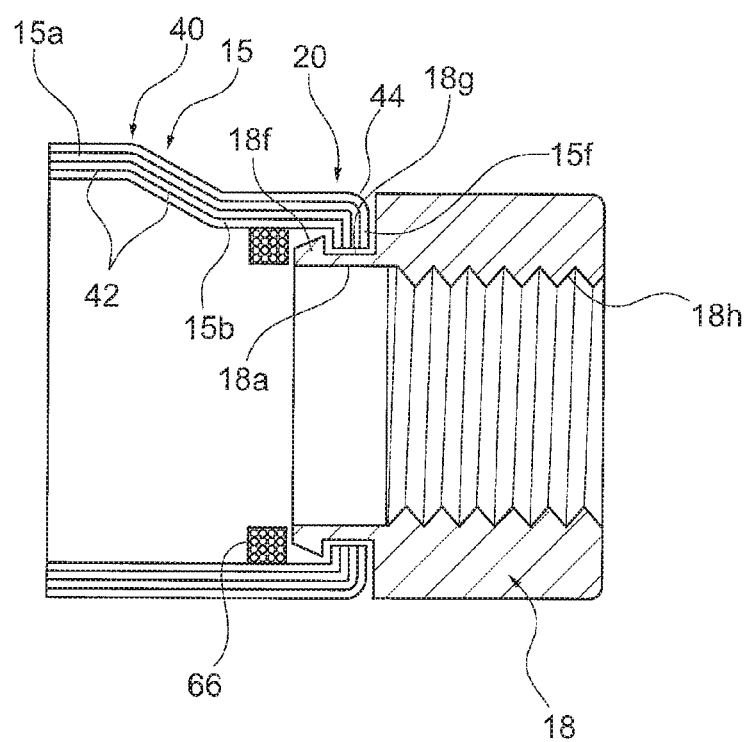
FIG. 15 is a sectional side view of the movable hood of the reel leg fixing apparatus according to an eighth embodiment of the present invention and the operation nut coupled therewith.

FIG. 15 is a sectional side view of the movable hood 15 of the reel leg fixing apparatus according to an eighth embodiment of the present invention and the operation nut 18 coupled therewith. As shown, in the embodiment, a reinforcement member 66 may be provided inside the fiber-reinforced resin member located in the vicinity of the coupling 20 so as to restrict the deformation of the movable hood 15 in the radially outward direction at the coupling 20. More specifically, a circumferential fiber layer (e.g., a prepreg sheet) including the reinforcement fibers oriented in the circumferential direction and serving as the reinforcement member 66 may be placed (or fitted) inside a portion of the prepreg sheet 40 on the distal end side of the locking projection 15f (bending portion 44) of the movable hood 15 according to the first embodiment.

Figure 16A:
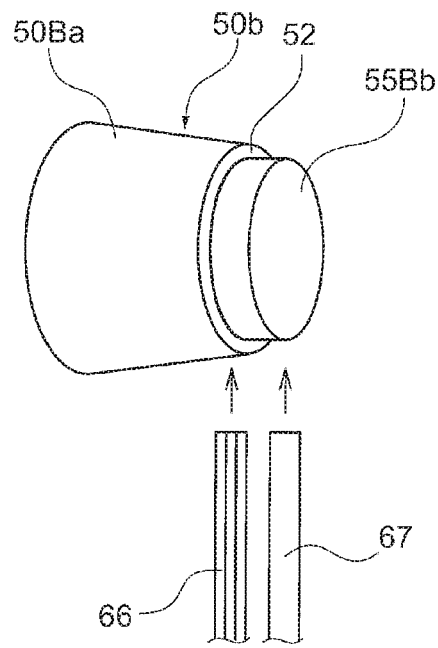
Figure 16B:
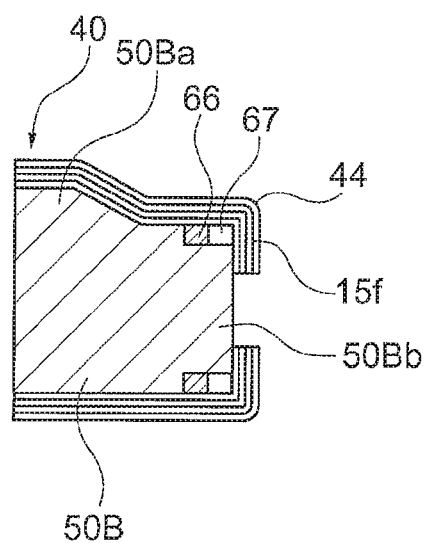

FIGS. 16a and 16b show an example of the method of forming the movable hood 15 of FIG. 15, wherein FIG. 16a is a schematic perspective view showing a circumferential fiber layer (e.g., a prepreg sheet) for forming a reinforcement member 66 of the movable hood 15 and a Teflon™ tape 67 as a spacer, being rolled around a mandrel 50B, and FIG. 16b is a sectional side view of a mandrel 50B having the prepreg sheet 40 for forming the movable hood 15, the reinforcement member 66, and the Teflon™ tape 67 rolled therearound. The mandrel 50B may include a large-diameter column 50Ba having a tapered shape conforming to the protrusion 15a of the movable hood 15, and a small-diameter column 50Bb extending from the large-diameter column 50Ba, so as to have a step 52 therebetween for forming the bending portion 44 of the locking projection 15f of the movable hood 15.

The process to provide the reinforcement member 66 as shown in FIG. 15 inside the prepreg sheet 40 (movable hood 15) may include, as shown in FIG. 16a for example, rolling the reinforcement member 66 around the small-diameter column 50Bb such that the reinforcement member 66 abuts the step 52, rolling the Teflon™ tape 67 around the proximal end side of the small-diameter column 50Bb so as to be adjacent to the reinforcement member 66, rolling the prepreg sheet 40 outside these members 66, 67 around the mandrel 50B as described above, (fastening the mandrel 50B with the fastening tape described above to form the bending portion 44) and heating and pulling out the mandrel 50B. After forming the movable hood 15, the Teflon™ tape 67 may be removed from the prepreg sheet 40, leaving on the inner surface of the prepreg sheet 40 an annular recess for receiving the locking projection 18f of the operation nut 18.

Such a reinforcement member 66 may restrict the deformation of the prepreg sheet 40 in the radially outward and axially outward directions at this portion, thereby eliminating stress concentration at this portion and thus preventing the removal of the locking projection 15f from the recess 18g.

Figure 17:
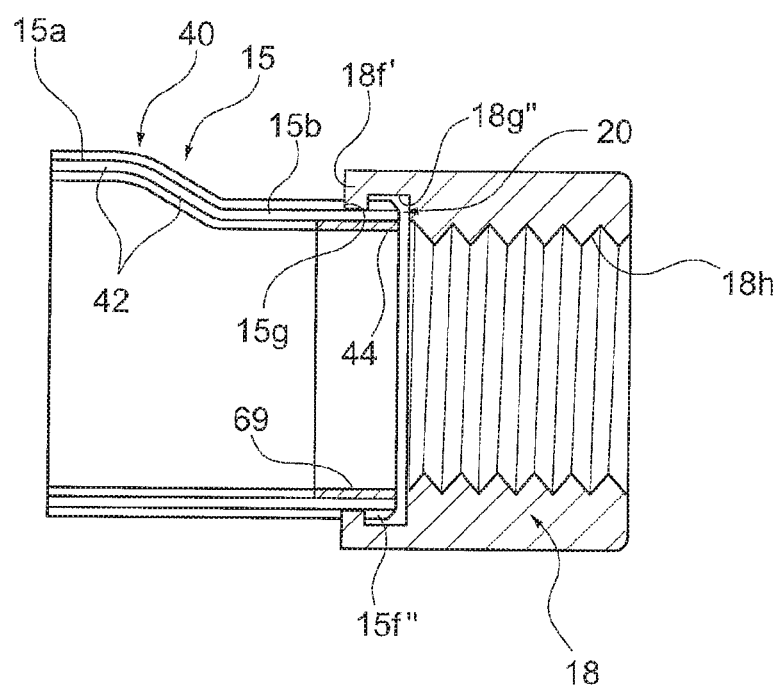
FIG. 17 is a sectional side view of the movable hood of the reel leg fixing apparatus according to a ninth embodiment of the present invention and the operation nut coupled therewith.

FIG. 17 is a sectional side view of the movable hood 15 of the reel leg fixing apparatus according to a ninth embodiment of the present invention and the operation nut 18 coupled therewith. In the above embodiments, the locking projections 15f, 15f′ of the movable hood 15 projecting radially inward may be locked in the recesses 18g, 18g′ formed in the outer circumferential surface of the operation nut 18, whereas in the embodiment, the annular locking projection 15f″ of the movable hood 15 projecting radially outward is locked in the annular recess 18g″ formed in the inner circumferential surface of the operation nut 18. In the embodiment, the annular locking projection 18f′ located at the distal end of the operation nut 18 and projecting radially inward so as to form the recess 18g″ may be locked in the annular recess 15g formed in the outer circumferential surface of the movable hood 15. Further, a reinforcement member 69 may be provided inside the fiber-reinforced resin member located in the coupling 20 so as to restrict the deformation of the movable hood 15 in the radially outward direction at the coupling 20. As in the above embodiments, the reinforcement member 69 may be constituted by a metal ring or a prepreg sheet including reinforcement fibers oriented in the circumferential direction. The reinforcement fibers 42 oriented in the axial direction in the coupling 20 may be either continuous without a break or radially divided into two layers. This arrangement also produces the same effect as in the above embodiments.

The embodiments of the present invention are not limited to the above descriptions and are susceptible to various modifications. For example, in the above embodiments, the movable hood and the operation nut, as well as the locking projection and the recess, may have any forms, as long as the reinforcement fibers oriented at least in the axial direction extend continuously at least in the coupling between the operation nut and the movable hood. In the above embodiments, the locking projection of the movable hood projecting radially inward may be locked in the recess formed in the outer circumferential surface of the operation nut. Conversely, it may also be possible that the annular locking projection of the movable hood projecting radially outward is locked in the annular recess formed in the inner circumferential surface of the operation nut.

What is claimed is:

1. A reel leg fixing apparatus comprising:
a movable hood having a tubular shape and including a protrusion protruding to have an opening for receiving a reel leg of a fishing reel;
an operation nut configured to be operated to move the movable hood in an axial direction, and
a reinforcement member configured to restrict outward deformation of the movable hood,
wherein
the movable hood and the operation nut are coupled together via a coupling comprising a locking portion bent and provided at an end of the movable hood that is engaged with a recess at an end of the operation nut,
the movable hood is formed of a first layer of a fiber-reinforced resin member including reinforcement fibers impregnated with a synthetic resin and oriented at least in the axial direction,
in the coupling, the locking portion comprises a second layer of the fiber-reinforced resin member stacked together with the first layer of the fiber-reinforced resin member in the radial direction, the second layer having reinforcement fibers with a longitudinal axis oriented in the axial direction wherein both ends of the reinforcement fibers of the second layer terminate in the recess at the end of the operation nut, and
the reinforcement member is provided along an outer surface or an inner surface of the fiber-reinforced resin member to restrict radially outward deformation of the movable hood at the coupling.

2. The reel leg fixing apparatus of claim 1, wherein the reinforcement fibers oriented at least in the axial direction extend continuously from an end of the locking portion through a bending portion of the locking portion toward the protrusion.

3. The reel leg fixing apparatus of claim 1, wherein the reinforcement fibers oriented at least in the axial direction extend continuously over the almost entire length of the movable hood.

4. The reel leg fixing apparatus claim 1, wherein the locking portion and the recess have an annular shape.

5. The reel leg fixing apparatus of claim 1, wherein the fiber-reinforced resin member is formed of a prepreg sheet including reinforcement fibers impregnated with a synthetic resin.

6. The reel leg fixing apparatus of claim 1, wherein the reinforcement member is formed of a metal ring-shaped member.

7. The reel leg fixing apparatus of claim 1, wherein the reinforcement member is formed of a prepreg sheet including reinforcement fibers oriented in a circumferential direction.

8. The reel leg fixing apparatus of claim 1, wherein the reinforcement member is positioned around the locking portion and the recess of the coupling.

* * * * *

UNITED STATES PATENT AND TRADEMARK OFFICE
CERTIFICATE OF CORRECTION

| | | |
|---|---|---|
| PATENT NO. | : 11,497,202 B2 | Page 1 of 1 |
| APPLICATION NO. | : 15/058441 | |
| DATED | : November 15, 2022 | |
| INVENTOR(S) | : Naito et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 146 days.

Signed and Sealed this
Eighteenth Day of February, 2025

Coke Morgan Stewart
*Acting Director of the United States Patent and Trademark Office*